US008544007B2

(12) United States Patent
Al-Aziz et al.

(10) Patent No.: US 8,544,007 B2
(45) Date of Patent: Sep. 24, 2013

(54) CUSTOMIZATION, DEPLOYMENT AND MANAGEMENT OF VIRTUAL AND PHYSICAL MACHINE IMAGES IN AN ENTERPRISE SYSTEM

(75) Inventors: Daniel Al-Aziz, Dublin (IE); Murat Karatutlu, Dublin (IE); Dennis Ivanov, Dublin (IE); Martin Perry, Dublin (IE); Keith McGuinness, Dublin (IE)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 12/880,934

(22) Filed: Sep. 13, 2010

(65) Prior Publication Data

US 2012/0066682 A1 Mar. 15, 2012

(51) Int. Cl.
*G06F 9/44* (2006.01)
*G06F 9/46* (2006.01)
*G06F 9/54* (2006.01)

(52) U.S. Cl.
USPC .................. 718/100; 717/168; 717/174

(58) Field of Classification Search
None
See application file for complete search history.

(56) References Cited

U.S. PATENT DOCUMENTS

| 7,281,247 | B2 * | 10/2007 | Lodwick et al. | 717/176 |
| 7,356,679 | B1 | 4/2008 | Le et al. | |
| 7,814,126 | B2 * | 10/2010 | Prabu et al. | 707/804 |
| 8,069,441 | B2 * | 11/2011 | Iizuka | 717/174 |
| 2004/0268292 | A1 * | 12/2004 | Steeb et al. | 717/100 |
| 2004/0268340 | A1 * | 12/2004 | Steeb et al. | 717/174 |
| 2004/0268345 | A1 * | 12/2004 | Lodwick et al. | 717/176 |
| 2005/0172285 | A1 * | 8/2005 | Bourke-Dunphy et al. | 717/177 |
| 2007/0294332 | A1 * | 12/2007 | Karki et al. | 709/203 |
| 2009/0083404 | A1 * | 3/2009 | Lenzmeier et al. | 709/221 |

OTHER PUBLICATIONS

Keahey, et al., "Virtual workspaces for scientific applications", Retrieved at <<http://iopscience.iop.org/1742-6596/78/1/012038/pdf/jpconf7_78_012038.pdf>> Journal of Physics: Conference Series 78, 2007, p. 6.

McNett, et al., "Usher: An Extensible Framework for Managing Clusters of Virtual Machines", Retrieved at <<http://usher.ucsd.edu/downloads/papers/usher-lisa07.pdf>> In the proceedings of 21st Large Installation System Administration Conference, 2007, p. 167-181.

Gardner, et al., "Using DS to Provision and Manage VMware VI 3 in Dell Server Envsironments", Retrieved at <<http://www.symantec.com/connect/articles/using-ds-provision-and-manage-vmware-vi-3-dell-server-environments>> Oct. 30, 2006, p. 6.

(Continued)

*Primary Examiner* — Meng An
*Assistant Examiner* — Benjamin Wu
(74) *Attorney, Agent, or Firm* — Turk IP Law, LLC (57) ABSTRACT

A web page behavior enhancement (WPBE) control element is provided on a rendered web page enabling a user to perform actions on at least a portion of the web page content such as customizing, editing, analyzing, forwarding, and/or annotating the content. The processed content may be presented on the original web page, on a locally stored version of the web page, or archived for subsequent use, where any changes to the original web page content may be tracked and the user notified about the changes. The WPBE control element(s) may be embedded into the web page at the source web application or at the local browser based on factors like web application capabilities, browser capabilities, user preferences, usage pattern, and comparable ones.

13 Claims, 9 Drawing Sheets

(56) References Cited

OTHER PUBLICATIONS

"Using a Virtual Lab for Your Application Lifecycle", Retrieved at <<http://msdn.microsoft.com/library/dd997438 (VS.100).aspx>> 2010, pp. 3.

Bolte, et al., "Non-intrusive Virtualization Management using libvirt", Retrieved at <<http://www.date-conference.com/proceedings/PAPERS/2010/DATE10/PDFFILES/05.6_3.PDF 2010, p. 6.

"Virtual Machine Manager", Retrieved at <<http://www.microsoft.com/systemcenter/en/us/virtual-machine-manager/vmm-features.aspx>>, 2010, p. 5.

Sotomayor, et al., "Overhead Matters: A Model for Virtual Resource Management", Retrieved at <<http://ieeexplore.ieee.org/stamp/stamp.jsp?tp=&arnumber=4299350>> In the proceedings of Second International Workshop on Virtualization Technology in Distributed Computing, 2006, p. 8.

* cited by examiner

CUSTOMIZATION, DEPLOYMENT AND MANAGEMENT OF VIRTUAL AND PHYSICAL MACHINE IMAGES IN AN ENTERPRISE SYSTEM

BACKGROUND

Software distribution in modern networked systems is far different from earlier methods, where software such as operating systems, applications, and comparable ones were installed on individual computing devices typically using removable storage media such as floppy disks or CD-ROMs. In some modern networks, different software is made available to users for downloading. In case of managed computing devices, administrators may reimage computing devices with new versions of software as those become available.

Deployment of software even using reimaging may take considerable time, however. In enterprise systems with complex distributed networks such as data centers, test labs, and/or build labs, where a significant number of machines may need new versions of software relatively frequently, the time consumed in deploying the software may have a negative effect on overall efficiency and performance. Furthermore, some systems may include physical and virtual machines, where the image deployment to both types may not be supported or require significant customization. Multiple facilities spread over different geographic regions may present complexities in deploying and controlling image deployment process. Moreover, the entire deployment may not be uniform in some cases; that is some users may need customized versions of software packages.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a globally-scalable imaging/reimaging approach that enables deployment, activation, and preparation of virtual and physical machine images rapidly reducing utilization costs of hardware such as test computing devices as well as costs of specific physical hardware by providing a centrally hosted virtualization environment. According to some embodiments, an extensible managed development platform is provided for scaling virtualization solution and for providing programmability (e.g. virtualization Application Programming Interfaces "API"s) for developing custom scenarios, scripts, and tools.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a globally-scalable imaging/reimaging system may enable deployment, activation, and preparation of virtual and physical machine images rapidly reducing utilization costs of hardware such as test computing devices as well as costs of specific physical hardware by providing a centrally hosted virtualization environment. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for distribution of software through imaging. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. The terms "client" and "machine" refer to computing devices, which receive new images from a system according to embodiments. Such devices may include desktop computers, laptop computers, mobile computers, handheld computers, specialized computers, and similar devices. More detail on these technologies and example operations is provided below.

Figure 1:
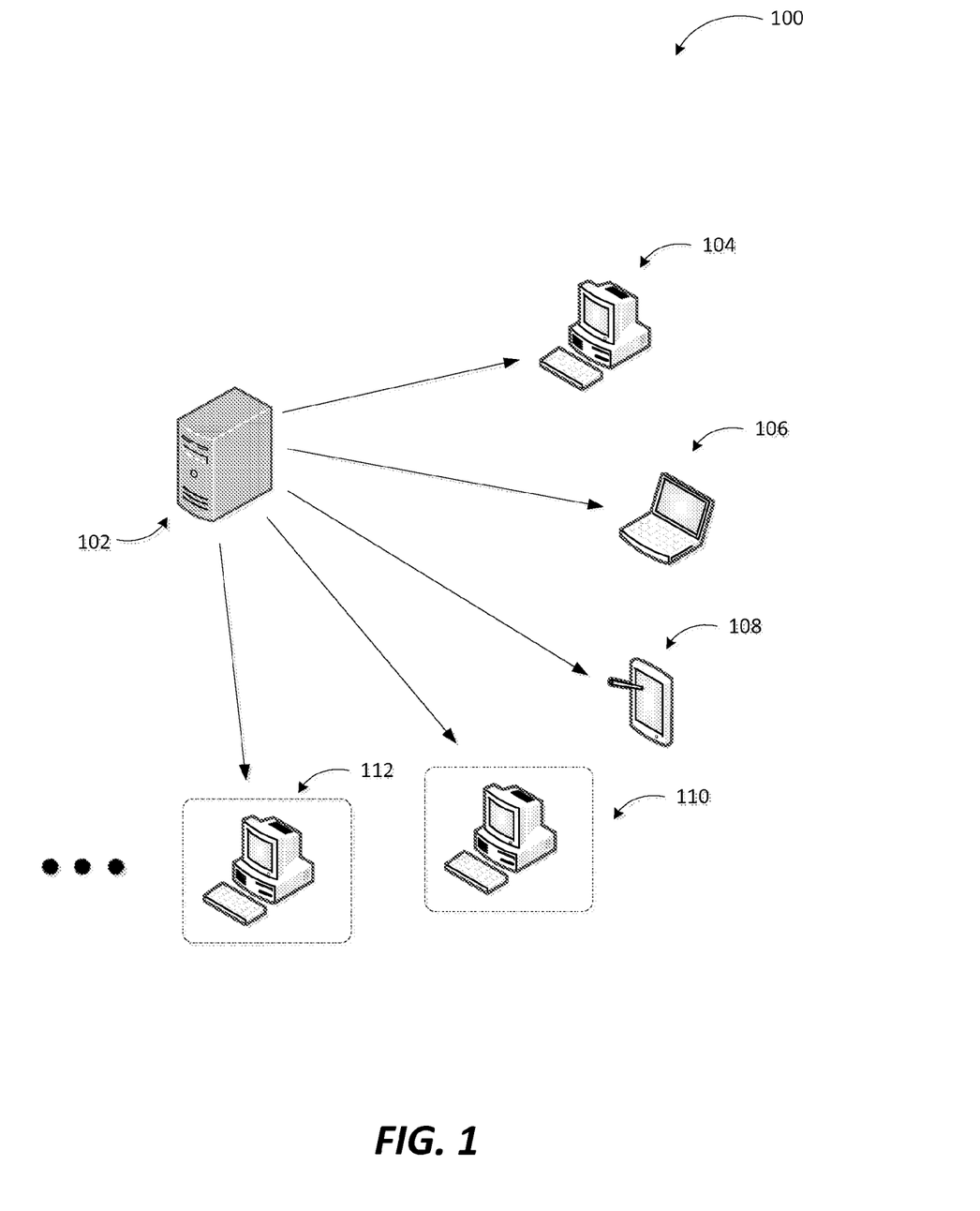
FIG. 1 illustrates an example software deployment system with physical and virtual machines, where embodiments may be implemented.

FIG. 1 illustrates an example software deployment system with physical and virtual machines, where embodiments may be implemented. Embodiments enable fast deployment of computing device images in complex distributed networks such as data centers, test labs, software build labs, and user desktops in a scalable form efficient manner. Conventional, non-object oriented language based systems present high code maintenance costs and debugging costs, while lacking reliable stability, type safety, and extensibility. With a built-in managed code interface-level compatibility and automatic code-generation of APIs, a reimaging system according to embodiments enables rapid regeneration of code for new versions of software.

Furthermore, a system according to embodiments supports mixed physical and virtual image deployments employing a cache tree approach. Through a layered design as well as multi-machine design of a workflow host, the system enables arbitrary scalability. Furthermore, image deployments may be centrally managed at facility and on user's desk machines enabling developers, testers, and operators to custom-deploy their virtual images rapidly. Moreover, automatic domain joining and role-based security are also supported by a system according to some embodiments. Other embodiments, may support large scale design (e.g. thousands of virtual machines and controllers) through the use of cache tree approach for image restoration reducing deployment time from minutes or hours to seconds, integration with storage area network "SAN" cloning, de-duplication, and object-oriented extensibility.

Diagram 100 illustrates an example system, where server 102 manages distribution of software to a variety of physical and virtual machines. Examples of such machines include, but are not limited to, desktop computer 104, laptop computer, 106, handheld computer 108, virtual computers 110 and 112. The machines may be part of a test environment, a software build environment, or similar grouping of computing devices, where software builds of various configurations are distributed in a centrally managed fashion.

Figure 2:
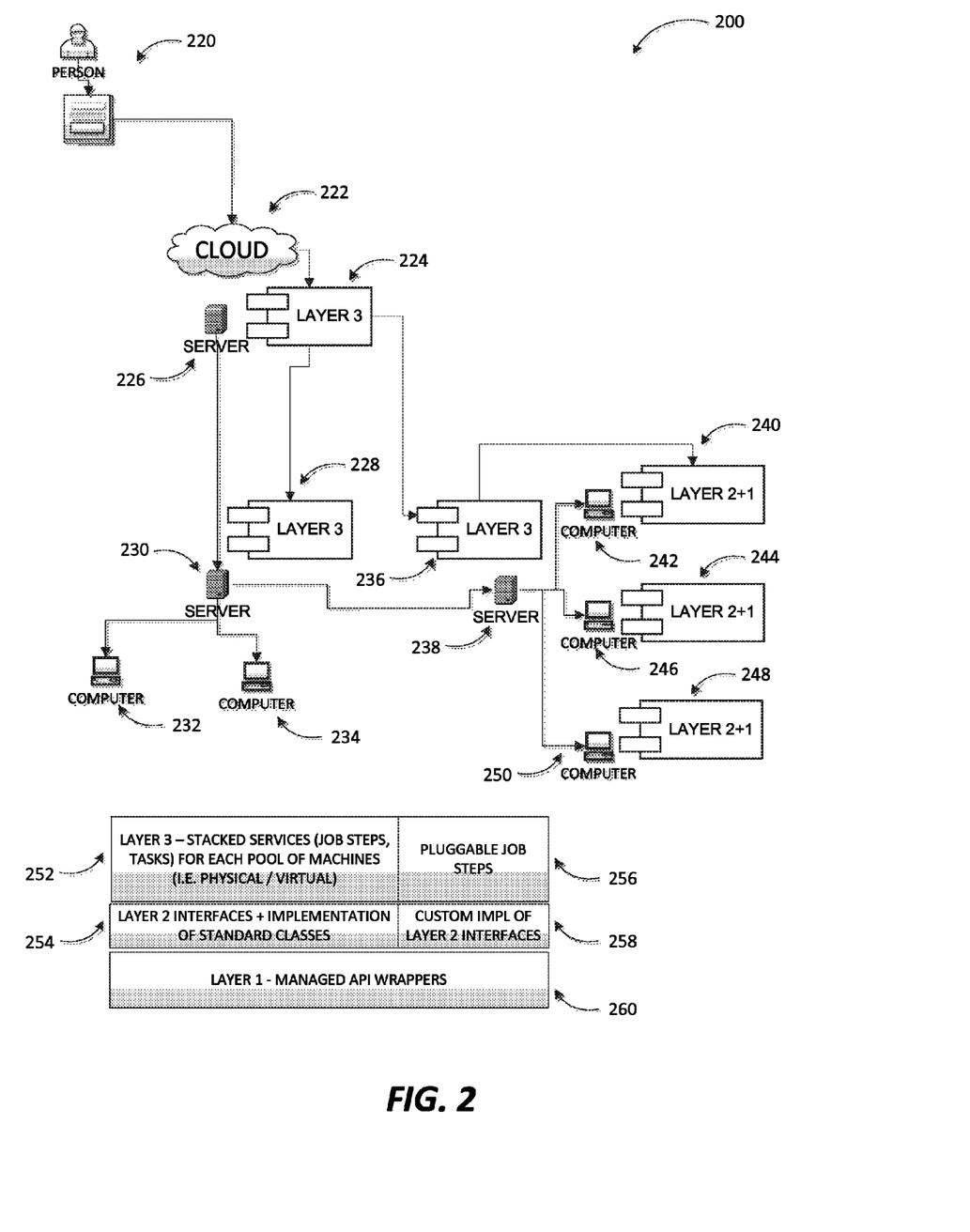
FIG. 2 illustrates how different layers of virtualization APIs may be employed in imaging physical and virtual computing devices in a system according to embodiments.

FIG. 2 illustrates how different layers of virtualization APIs may be employed in imaging physical and virtual computing devices in a system according to embodiments. Virtualization API structure, as shown in diagram 200, includes layer 1 of managed API wrappers (260), layer 2 of interfaces and implementation of standard classes (254) along with custom implementation of layer 2 interfaces (258), and layer 3 of stacked services (e.g. job steps, tasks, etc.) for each pool of machines virtual or physical (252) along with pluggable job steps 256.

A consumer 220 may submit a request through a cloud layer 222, which is routed to servers 226 implementing layer 3 (224). Server 226 may create the workflow and interact with servers 230 and 238 implementing layer 3 (228 and 236 respectively), which interact with respective machine pools (computers 232 and 234 for server 230; computers 242, 246, and 250 for server 236). Computers 242, 246, and 250 are shown as implementing layers 1 and 2 (240, 244, and 248 respectively).

A system according to embodiments may include a machine management service, which provides a central repository (storage) of standard and custom job steps. Machine management service may initialize host operating system and deploying related components required to create and run virtual machines. Host may be set up during pre-initialization stage. Network initialization may also be provided in conjunction with host initialization.

Support of secure communications of credentials over to finite state machine management (FSM), hosts, and clients may be provided through security groups, which may be added to the group of machines enabling access control and job submission from clients. Users may be enabled to add themselves through a central site, and group owners may decide whether to give permissions for certain users to deploy images on the machines the group is added to.

Figure 3:
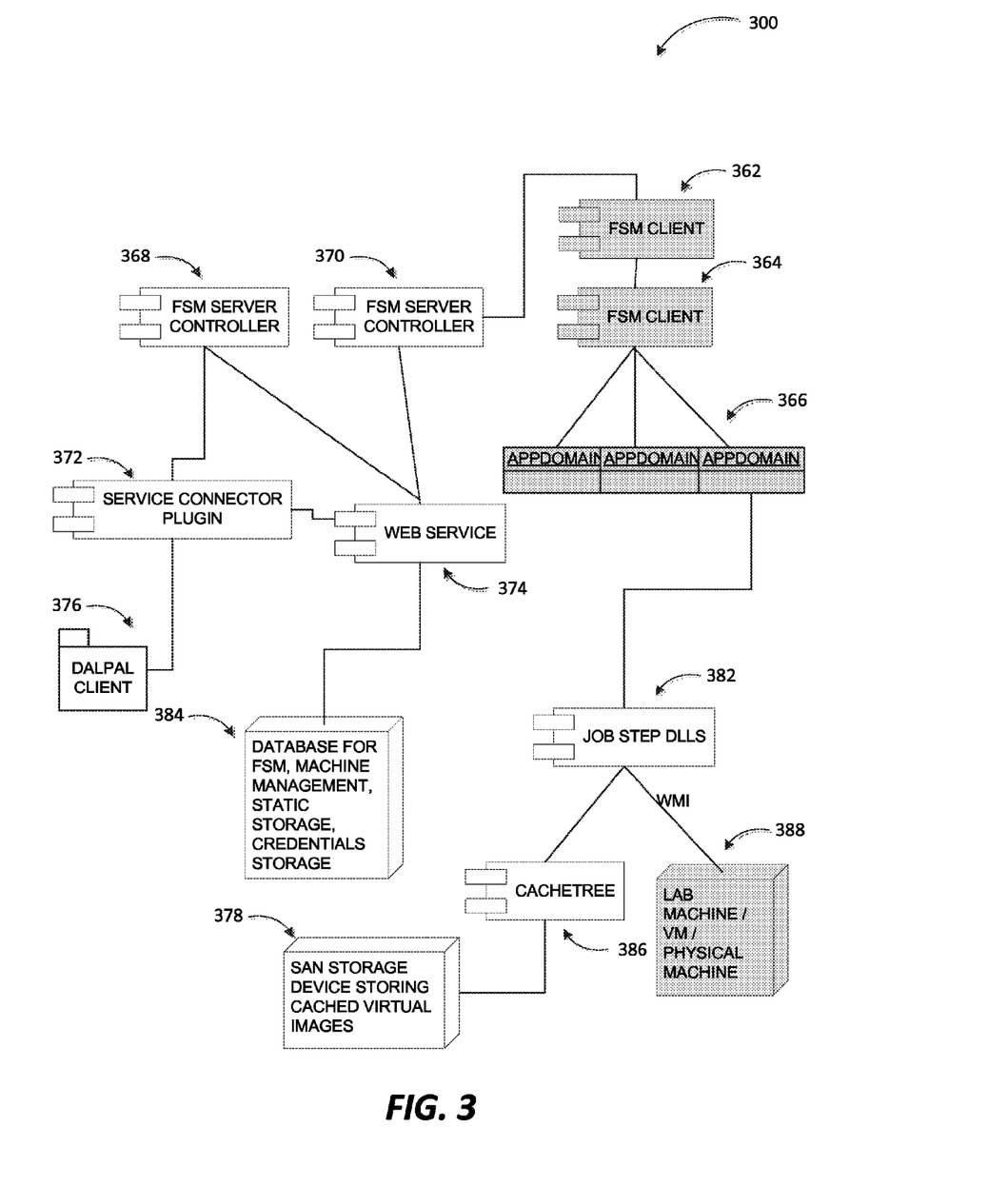
FIG. 3 is a diagram illustrating operation of a finite state machine manager (FSM) system that may be employed in imaging virtual and physical computing devices according to some embodiments.

FIG. 3 is a diagram illustrating operation of a finite state machine manager (FSM) system that may be employed in imaging virtual and physical computing devices according to some embodiments. The FSM system shown in diagram 300 provides functionality for machine state serialization/deserialization for job step execution, trace, logging, and status reporting on jobs that are currently running in the imaging system.

FSM needs to handle workflow of job submission once a request comes from any client 376 through the web service 374. Web service 374 is a single point of communication with the system for the clients to communicate with controllers 368, 370 or database 384. Data access layers for machine management and job workflow components may be employed to enable the communication. FSM controllers 368, 370 may communicate with the database 384 through the web service 374 so that the database can be physically decoupled from another machine. The system may accommodate several FSM server controllers, as shown, provided for scalability. The system may also accommodate several loosely coupled FSM clients that can connect to the FSM Server. Some imaging system clients such as client 376 may connect to the server through a server connector plugin 372.

FSM may choose a workflow based on request submitted from a client by the user to the web service, obtain metadata on machines the job steps need to run on, and submit the workflow for execution to FSM client. FSM client (362, 364) creates a separate workflow. The system also provides functionality to distribute workflows between several clients for cases where too many requests for jobs have arrived to the server and transmitted to FSM clients. Each application domain 366 is used to run a single workflow. FSM may not communicate tasks to individual client machines with WMI. Instead, job steps themselves may run on FSM clients 362, 364 and remotely execute tasks on machines to be imaged 388. A SAN storage device 378 may be used to store cached virtual images.

Workflow execution may be stopped/paused/and resumed on request. Ongoing job steps may be serialized as they start, so the database 384 is also used to guarantee persistence. If at any point, one of the machines in the infrastructure goes down, is rebooted or replaced, the job may need to be able to stop and resume once failure is addressed. A system according to embodiments provides functionality for canceling jobs and killing job steps that have not been run yet. In the scenario where a user has mistakenly submitted an imaging job and selected a wrong application version or component, and realized that while job is running, the user needs to be able to cancel deployment. If the deployment targets a virtual machine and requires reimaging, the virtual machine can be deleted. If the target is a physical machine, operating system deployment may need to be completed and the machine brought back to the operational state again. If a job step requires image transfer, a relevant part of the image may be discovered and transferred if parts of that image are already downloaded to the machine before. A compression algorithm may be used to facilitate data transfers. According to other embodiments, the system may report the status of each job step (382) such as pass/fail and/or detailed information back to the client.

The web service 374 is a high-level interface between clients, FSM controller and persistence. If database 384 needs to be changed, for example, to a text file, FSM controller, clients and a web service may not require any changes. A corresponding client library may be replaced and point to another data source. Job steps that require credentials for installers may receive credentials via a call from FSM server. The accounts and passwords for system accounts may be encrypted and stored on the server (or database 384). The cache tree structure is also stored on database 384.

Figure 4:
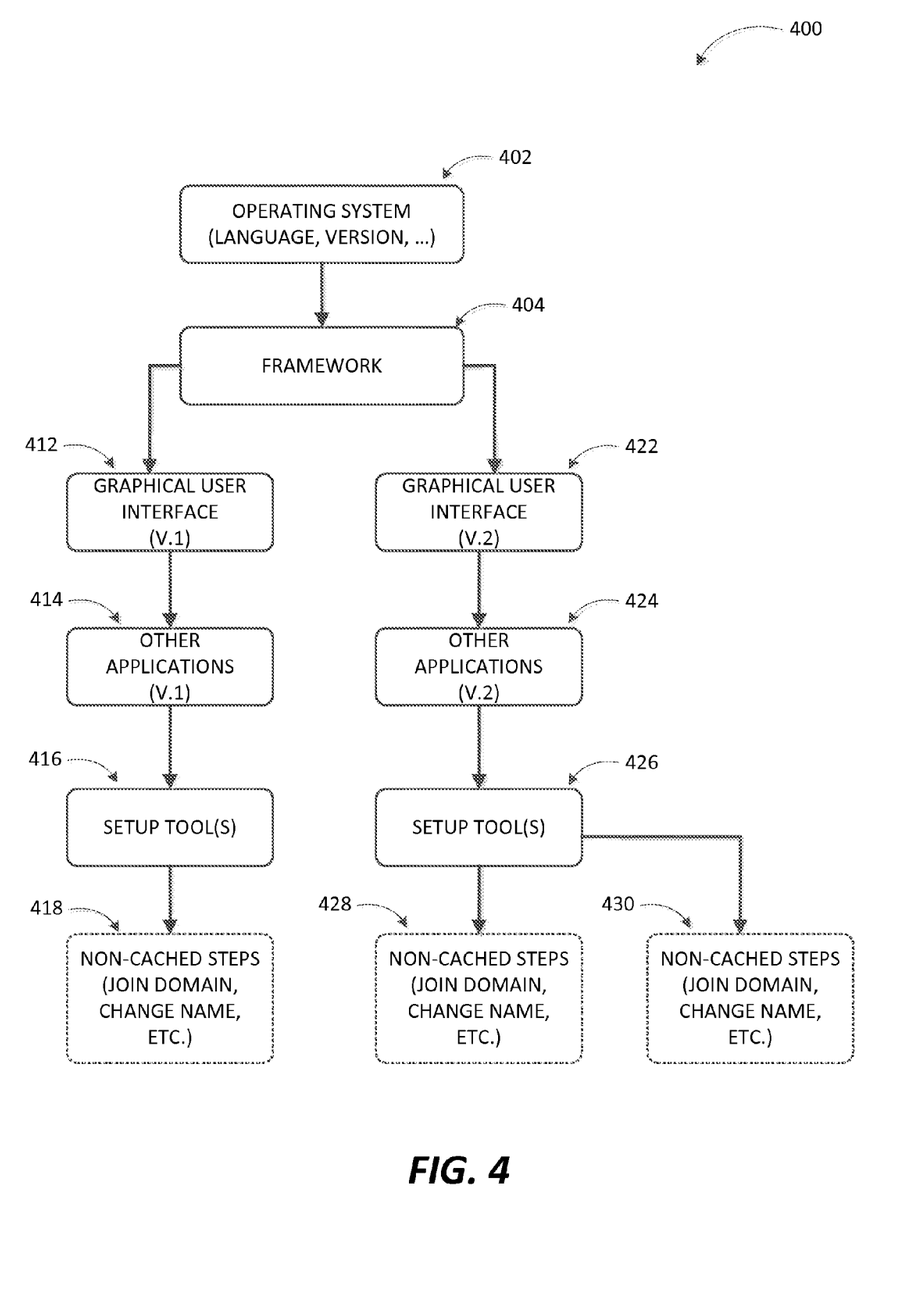
FIG. 4 illustrates an example cache tree for creating virtual machines.

FIG. 4 illustrates an example cache tree for creating virtual machines. For optimal image restore performance, disk space utilization, patch/version management, and scalability, a system according to some embodiments may implement image caching both for SAN and for desktop deployment. Images that have same operating system but different configuration (i.e. different installed applications, application configurations, automation components, etc.) may be created as a series of differencing disk files. When deployed, these may be appended one after the other according to the job steps.

A Job contains one or more job steps. A cache tree like the one illustrated on diagram 400 may be used to share the state of these job steps across jobs decreasing the time needed to perform a job as some or all of the job steps may be pre-cached. The same approach may also be used to decrease the amount of disk space and I/O foot print used in a central SAN virtual farm deployment.

If a job contains non-cacheable job steps followed by cacheable steps, the cacheable steps to be run after a non-cacheable job step may be treated as non-cacheable job steps. In other words, a job step may be cached if it is marked as cacheable and no non-cacheable steps have been performed prior to it.

If a new software build comes in, the new root image may be created and the tree branch rebuilt on demand during the first execution of a specific task. Old branch may be removed ("pruned"). Recently used images may be created automatically after pruning of the tree. The caching functionality may be implemented as a separate assembly containing common interfaces. The tree structure may be stored in the structured database. To ensure consistency between the database and the SAN content, restrictive permission configuration may be implemented so that only caching engine is allowed to add images to the cache. Additional tools may be employed to ensure consistency and rebuild the tree if data becomes corrupt.

The example cache tree in diagram 400 is used to create 3 virtual machines. All three machines receive the same operating system 402 and operating system configuration such as language, version, etc. The machines also receive the same framework 404 (e.g. .NET framework by MICROSOFT CORP. of Redmond, Wash.). A framework provides a library of coded solutions to common programming issues and a virtual machine that manages the execution of programs written specifically for the framework. The framework's library may provide a range of features including user interface, data access, database connectivity, cryptography, web application development, numeric algorithms, and network communications. Thus, the imaging jobs for the three machines include the common job steps of installing the same operating system and framework, which are cached for all jobs using this tree.

One of the virtual machines is to be imaged with version 1 of the graphical user interface component 412 and other applications 414, while the other two virtual machines receive version 2 of the graphical user interface component 422 and other applications 424. Thus, even though all three machines receive the same setup tools, that job step is split into two separate nodes on the job tree branches for the first machine and second/third machines (416, 426). Non-cached steps 418, 428, and 430 such as changing the name of the machine, joining the domain, etc. are scheduled following the cached steps for each machine, respectively. Since virtual machines two and three share the same cached components and configurations, their branches split only before the non-cached step.

In a system according to embodiments, the first machine to perform these steps takes the hit of performing the cacheable steps. The second machine finds the last applicable cached step and performs the final non-cacheable steps.

Figure 5:
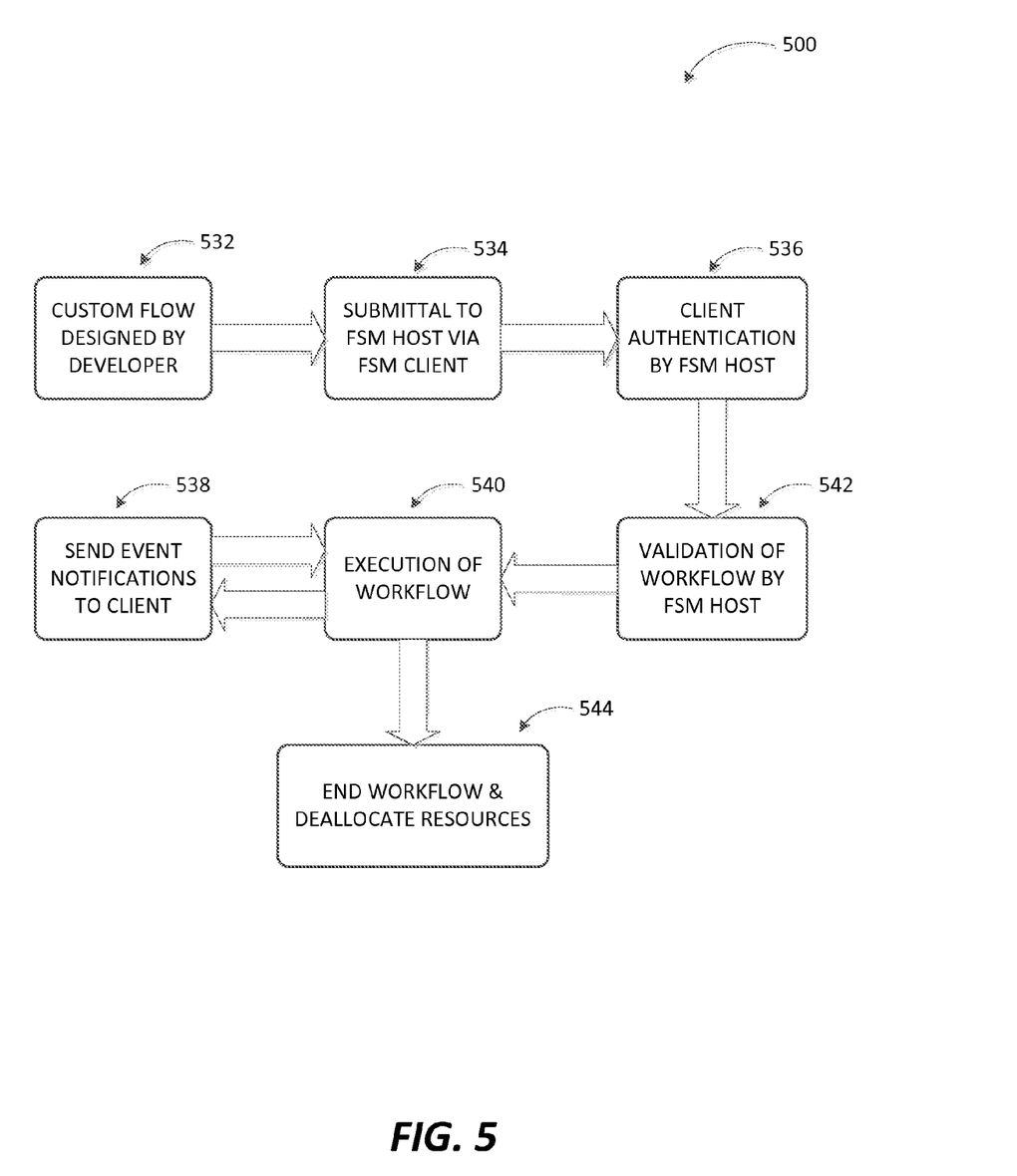
FIG. 5 illustrates process steps in execution of a workflow for activities associated with virtual and physical computing device imaging by a workflow host.

FIG. 5 illustrates process steps in execution of a workflow for activities associated with virtual and physical computing device imaging by a workflow host. A workflow host provides functionality for machine state serialization/deserialization for job step execution, trace, logging, and status reporting on jobs that are currently running.

Finite state machine manager (FSM) is used by the virtualization service to deploy, configure, and update virtual hosts. FSM provides customizable security, generic workflow management, and support for specific job steps. FSM may utilize a secure communication with its clients and enables full control on workflows.

A workflow package may include a base FSM workflow library, any custom job steps to be implemented, any custom tools needed by the workflow, and a workflow definition file to describe the process. An FSM client is loosely coupled with the FSM host, so any developer may develop a custom client (532) and integrate it with the FSM host (534). An FSM client needs to use a secure remoting channel to communicate with the host and needs to be running under a user account that can be authenticated by the host (536) and/or have an IP that is known by the host, if using a "gate keeper", which is an extra component in FSM host to authenticate and authorize the clients. If the gate keeper component is enabled, host may use the information from its configuration file to authenticate the client and the user credentials. Host may ensure that the workflow definition is valid (542) and the required types can be resolved to prevent further problems when executing the workflow (540). The workflow is started and event sent back to the client (538) as they occur until an exception is caught or the workflow is finished (544). Host may de-allocate the resources (544) used to execute the workflow.

Figure 6:
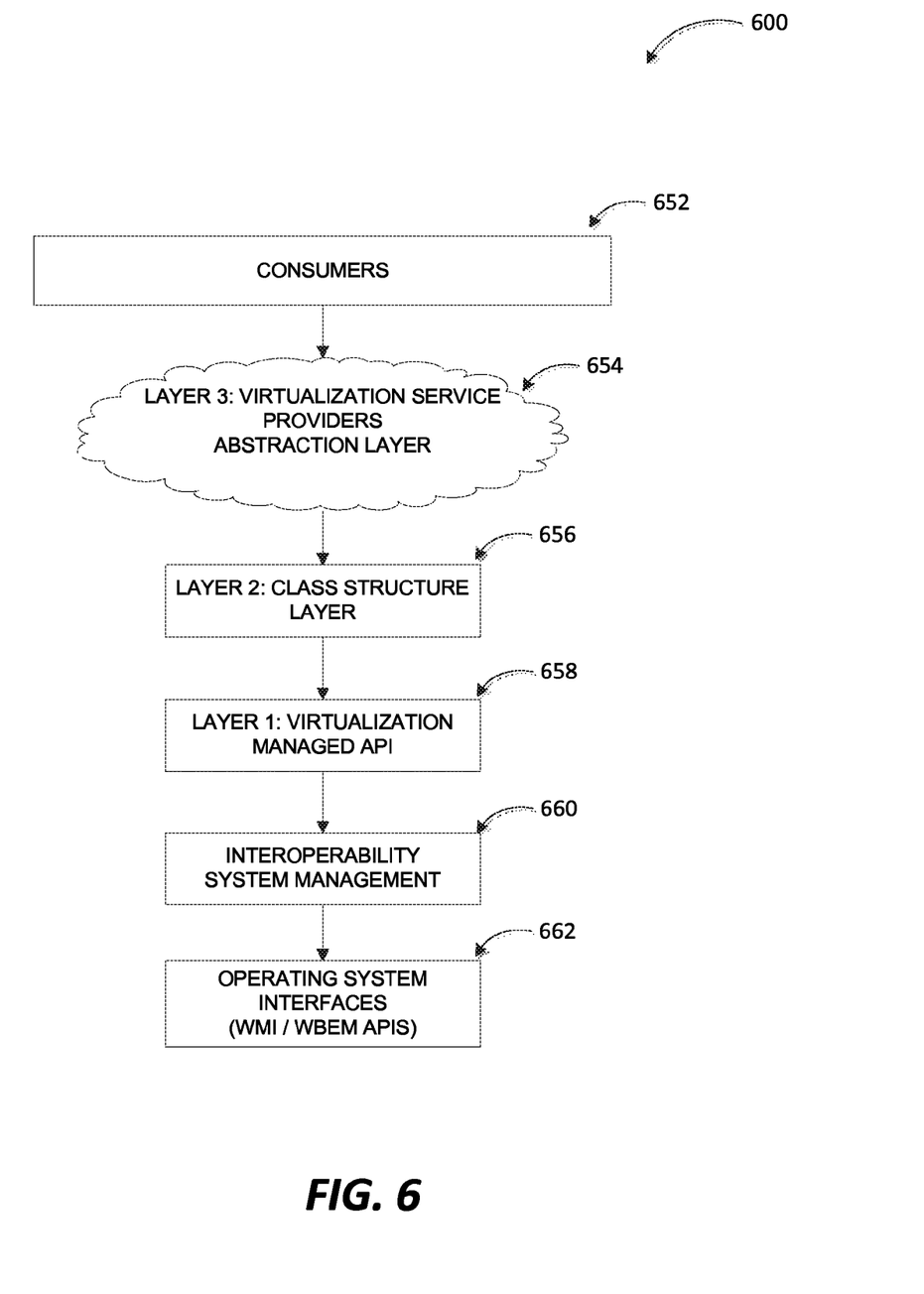
FIG. 6 illustrates the three-layered structure of virtualization APIs that may be implemented in an imaging system according to embodiments.

FIG. 6 illustrates the three-layered structure of virtualization APIs that may be implemented in an imaging system according to embodiments. A virtualization API used by an imaging system as described herein may include two layers 659 and 658. The third layer 654 may be used to expose the virtualization API in the cloud layer for the fourth layer 652 (consumers) to consume.

First layer 658 is the virtualization managed API mitigating programmatic errors with a strongly typed wrapper and pushing the errors into compile-time. First layer 658 interacts with operating system interfaces 662 through interoperability system management layer 660. Operating system interfaces may include Windows Management Instrumentation® (WMI) by Microsoft Corp. of Redmond, Wash., which is a set of extensions to the driver model that provides an operating system interface for instrumented components to provide information and notification. Another, more generic example of operating system interfaces includes Web-Based Enterprise Management (WBEM), which defines a set of environment-independent specifications allowing management information to be shared between management applications. The WMI model represents a managed environment through which management data from any source can be accessed in a common way in order to unify the management of distributed computing environments.

Second layer 656 is a class structure layer that wraps the framework namespace into a more cohesive class structure, and implements extensibility classes. Second layer 656 may expose classes to developers in a logical way that allows a developer targeting virtualization automation more effectively and without prior knowledge of class relationships.

The service provider-level layer (i.e. "cloud layer") integrates clients and has interfaces for job steps. This third layer 654 defines transport classes (e.g. web services for "pull" layout, TCP for "push" layout, etc.). Consumers represented by the fourth layer 652 interact with the system through the cloud layer.

To summarize, the virtualization APIs create a strong-typed managed API wrapper for WMI class implementation, provide a managed framework for developers to design against virtualization APIs, address issues with error codes handling, eliminate the need to reference WMI documentation, provide class structure for construction of virtualization deployment applications, and create an extendable framework for developers to use.

The example systems, components, and interactions discussed in FIG. 1 through FIG. 6 are for illustration purposes only and do not constitute a limitation on embodiments. Virtual and physical enterprise system imaging may be implemented with other components, interactions, data processing/storage methods, and configurations using the principles described herein.

Figure 7:
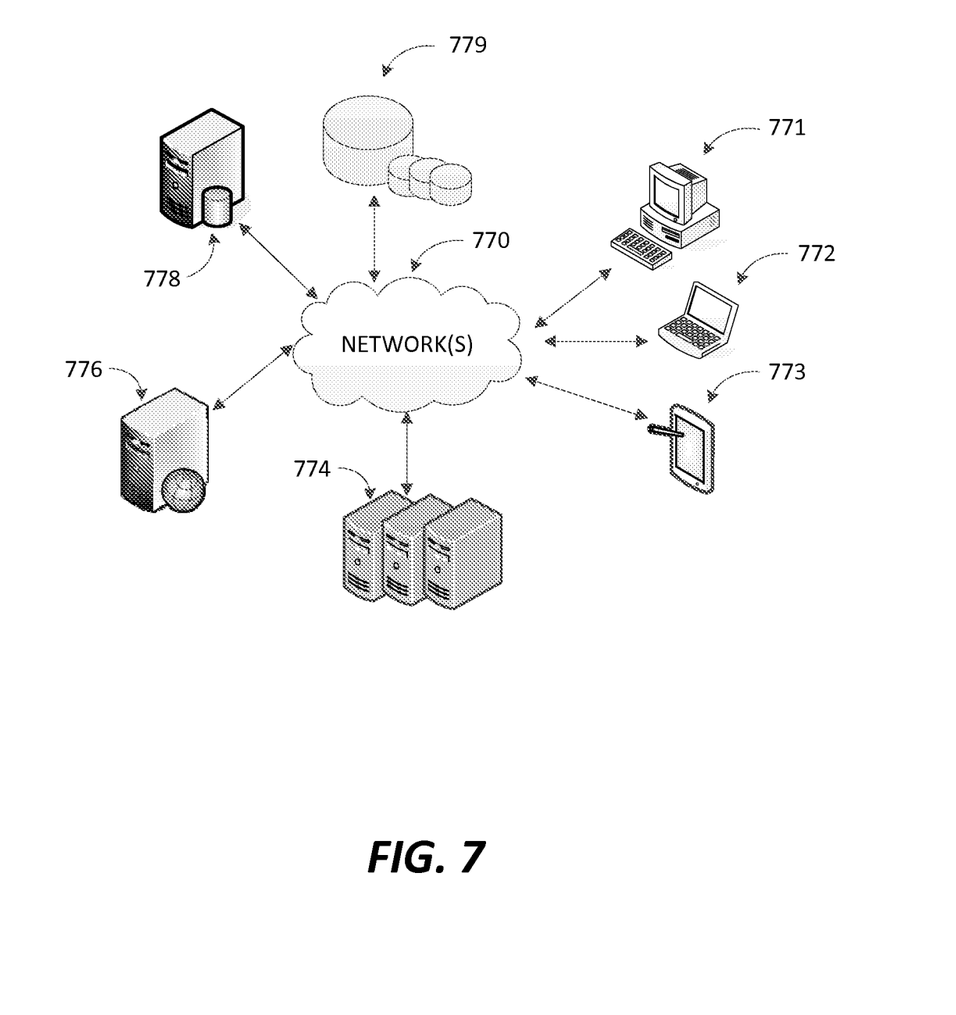
FIG. 7 is a networked environment, where a system according to embodiments may be implemented.

FIG. 7 is an example networked environment, where embodiments may be implemented. A platform providing virtual and physical enterprise system imaging may be implemented via software executed over one or more servers 774 or a single server 776 such as a hosted service. The platform may communicate with client computing devices such as a handheld computer 773, a laptop computer 772, or desktop computer 771 ('client devices') through network(s) 770.

As discussed above, a globally imaging/reimaging platform for deployment, activation, and preparation of virtual and physical machine images rapidly according to embodiments provides a centrally hosted virtualization environment. The extensible managed development platform enables scaling virtualization solution and provides programmability through virtualization APIs for developing custom scenarios, scripts, and tools. The platform may store and retrieve imaging data at/from data stores 779 directly or through database server 778.

Network(s) 770 may comprise any topology of servers, clients, Internet service providers, and communication media. A system according to embodiments may have a static or dynamic topology. Network(s) 770 may include secure networks such as an enterprise network, an unsecure network such as a wireless open network, or the Internet. Network(s) 770 may also coordinate communication over other networks such as Public Switched Telephone Network (PSTN) or cellular networks. Furthermore, network(s) 770 may include short range wireless networks such as Bluetooth or similar ones. Network(s) 770 provide communication between the nodes described herein. By way of example, and not limitation, network(s) 770 may include wireless media such as acoustic, RF, infrared and other wireless media.

Many other configurations of computing devices, applications, data sources, and data distribution systems may be employed to implement virtual and physical enterprise imaging. Furthermore, the networked environments discussed in FIG. 7 are for illustration purposes only. Embodiments are not limited to the example applications, modules, or processes.

Figure 8:
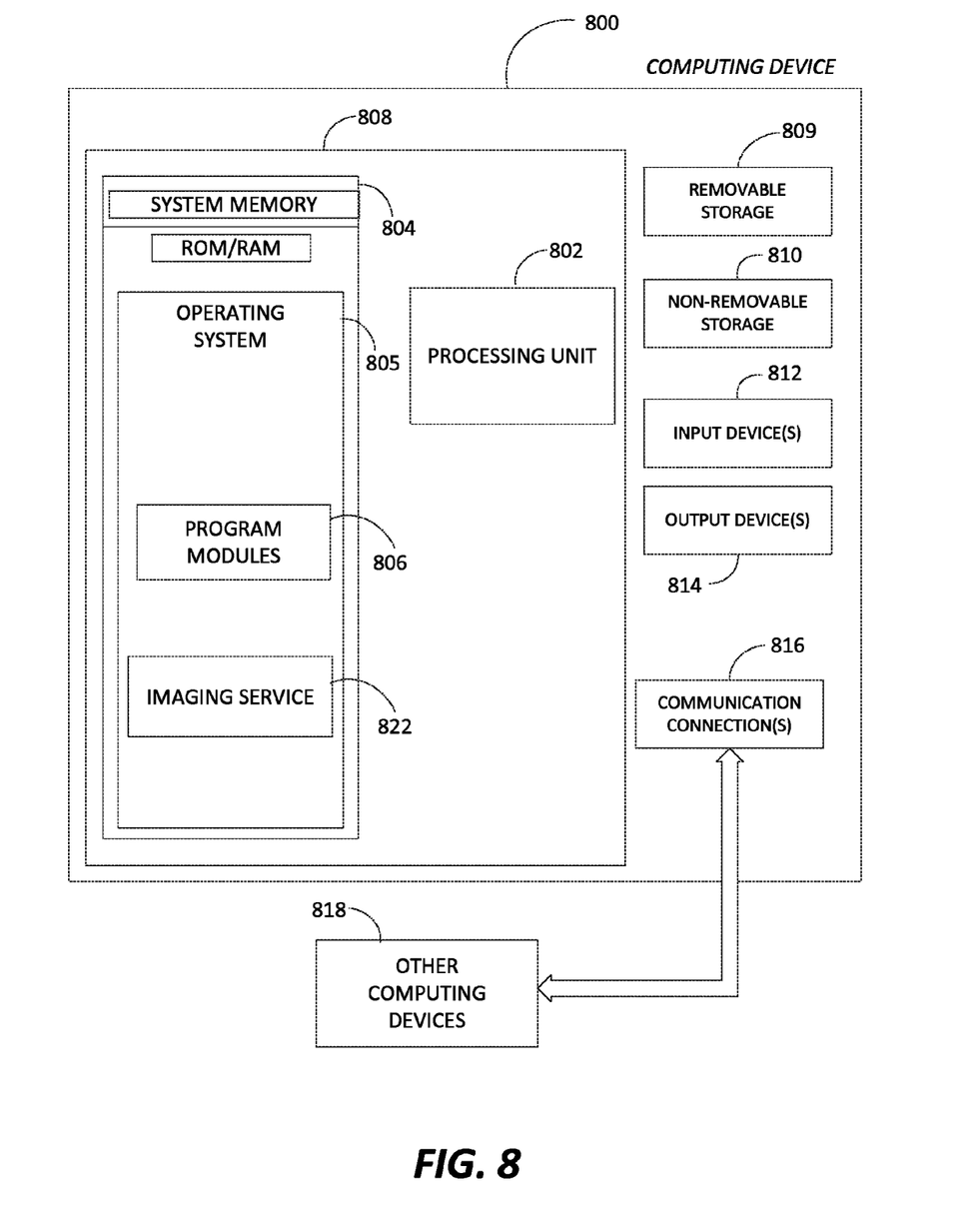
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be a server providing an imaging service and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806 and imaging service 822.

Imaging service 822 may be an application or hosted service maintaining different configurations including customized versions of software packages for distribution to computing devices through imaging or reimaging. Imaging service 822 may utilize multi-layered virtualization and a cache tree for efficiently distributing software packages as discussed previously. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wireless network in a distributed computing environment, a satellite link, a cellular link, and comparable mechanisms. Other devices 818 may include computer device(s) that receive images of new/updated versions of software. Communication connection(s) 816 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 9:
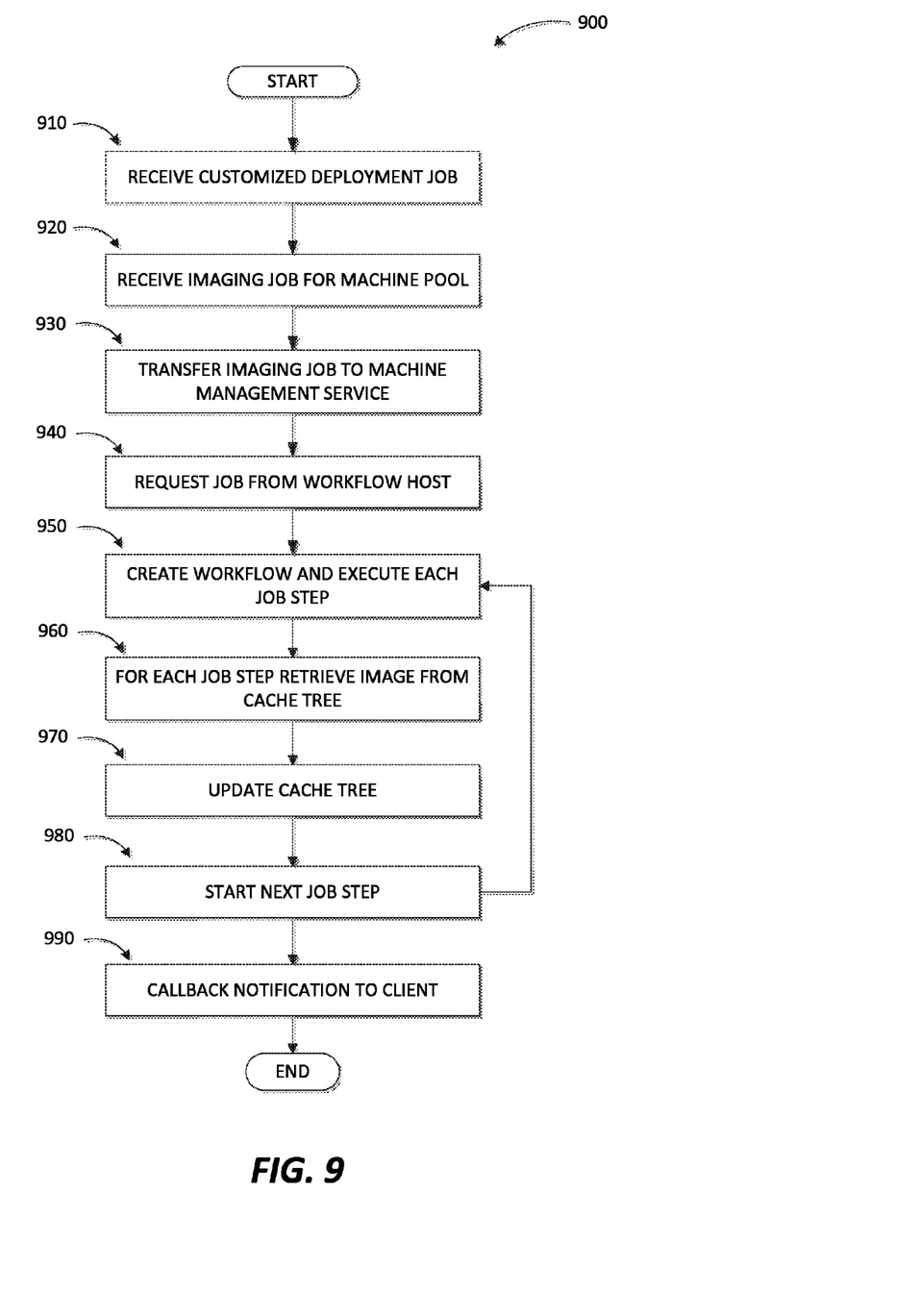
FIG. 9 illustrates a logic flow diagram for a process of virtual and physical enterprise system imaging according to embodiments.

FIG. 9 illustrates a logic flow diagram for process 900 of providing virtual and physical enterprise system imaging according to embodiments. Process 900 may be implemented on a server managing software distribution for a plurality of networked computing devices.

Process 900 begins with optional operation 910, where a developer created customized deployment job is received and registered with the machine management database. Alternatively, the deployment job may be registered as an existing operating system deployment job provided with the system. At operation 920, an imaging job for an allocated machine pool may be received from a user of the imaging system through the system user interface. The imaging job may be transferred to a machine management service (e.g. a web service) connected to the machine management database and one of corresponding workflow hosts at operation 930. Next, the machine management service may request a job from the workflow host and provide relevant machine configuration data context to the workflow host at operation 940.

At operation 950, the workflow host may create a workflow linked to the configuration context and execute each job step within that context on a specific target machine described in the context using remote calls. Once each job step is activated, a job step library may activate cache tree logic incorporated into the root job step class to retrieve an image related to that job step from the cache tree at operation 960. Depending on the context, if SAN is set as a target, cloning caching may be used for image retrieval; if a desktop PC is used, a compression algorithm may be used for image retrieval. Once the image is deployed, a custom job step logic may be activated provided in the appropriate managed class. Upon completion of the custom logic tasks, the result may be added back to the cache tree as a new clone or added to a desktop cache as a differencing disk, and the cache tree extended to immediately support other machines with similar demand without the need to execute custom job step logic anymore at operation 970. This enables bulk-imaging where a large number of machines are involved in having the same image deployed. Instead of having all machines dedicate time to create cache tree, machine time utilization is minimized down to a single master machine.

At operation 980, next job step in the cache tree is started upon completion of the current job step in an iterative fashion until the workflow finishes. When the workflow is completed, the result may be sent back to machine management, which is reflected in the database, and the job requesting client notified by a callback notification from the machine management service.

The operations included in process 900 are for illustration purposes. Virtual and physical enterprise system imaging according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for enterprise system imaging, the method comprising:
   receiving a developer created customized deployment job; and
   registering the customized deployment job, wherein the customized deployment job is registered as one of an image deployment job and an existing operating system deployment job;
   receiving an imaging job request;
   transferring the received imaging job request to a machine management service, wherein the machine management service manages a plurality of workflow hosts;
   requesting the imaging job from a workflow host, wherein the workflow host executes a workflow;
   creating the workflow comprising job steps based on a configuration context of the imaging job request;
   executing the workflow, wherein an image related to each job step is retrieved from a cache tree for each job step;
   if an image is created for a job step, updating the cache tree with the newly created image;
   if a customization task is performed as part of the imaging job, adding a result of the customization task to one of the cache tree as a new clone and a desktop cache as a differencing disk;
   extending the cache tree such that machines with similar imaging demand are supported without executing the customization task again; and notifying a client submitting the imaging job request through a callback.

2. The method of claim 1, further comprising:
if a target for the imaging job is a storage area network (SAN), employing cloning caching for image retrieval; and
if the target for the imaging job is a computer, employing a compression algorithm for image retrieval.

3. The method of claim 1, wherein the workflow further comprises automatic domain joining and renaming for machines receiving the image.

4. A system for providing imaging of computing devices, the system comprising:
a processor;
a finite state machine management (FSM) server executing on the processor configured to:
receive a developer created customized deployment job;
register the customized deployment job with a machine management service;
a machine management server executing the machine management service configured to:
provide machine configuration data context to a workflow host;
request an imaging job from the workflow host; and
the FSM server executing at least one workflow host configured to:
create a workflow comprising job steps based on the machine configuration context associated with the imaging job request;
execute the workflow, wherein an image related to each job step is retrieved from a cache tree for each job step;
if an image is created for a job step, update the cache tree with the newly created image;
delete a virtual machine if a target of the imaging job is the virtual machine requiring reimaging;
deploy an operating system and bring a machine to an operational state if the target of the imaging job is a physical machine;
discover a relevant part of an image to be deployed if a job step requires image transfer;
transfer the image if parts of the image are already downloaded to a target machine; and
provide a result of the workflow execution to the machine management service upon completion of the workflow.

5. The system of claim 4, wherein the imaging job request is executed for at least one of a physical computer and a virtual computer.

6. The system of claim 4, wherein the system employs a virtualization service that includes a first layer comprising managed application programming interfaces (APIs), a second layer comprising interfaces for implementation of classes, and a third layer comprising stacked services for each pool of machines to be imaged.

7. The system of claim 4, wherein the FSM server is further configured to provide functionality associated with at least one from a set of: machine state serialization/deserialization for job step execution, tracing, logging, and status reporting on jobs that are currently running in the system.

8. The system of claim 4, wherein the FSM server is further configured to:
discover a relevant part of an image to be deployed if a job step requires image transfer; and
transfer the image if parts of the image are already downloaded to a target machine.

9. The system of claim 4, wherein the FSM server is further configured to de-allocate resources upon completion of the workflow execution.

10. A computer-readable memory with instructions stored thereon for enterprise system imaging, the instructions comprising:
receiving a developer created customized deployment job;
registering the customized deployment job with a machine management service;
receiving an imaging job request;
transferring the received imaging job request to the machine management service;
requesting the imaging job from a workflow host by the machine management service, wherein the workflow host executes the workflow;
creating a workflow at the workflow host, the workflow comprising job steps based on a configuration context of the imaging job request;
executing the workflow at the workflow host, wherein an image related to each job step is retrieved from a cache tree for each job step;
if an image is created for a job step, updating the cache tree with the newly created image;
deleting a virtual machine if a target of the imaging job is the virtual machine requiring reimaging;
deploying an operating system and bring a machine to an operational state if the target of the imaging job is a physical machine;
discovering a relevant part of an image to be deployed if a job step requires image transfer;
transferring the image if parts of the image are already downloaded to a target machine;
and notifying a client submitting the imaging job request through a callback from the machine management service.

11. The computer-readable memory of claim 10, wherein the job steps are serialized as they start to ensure persistence.

12. The computer-readable memory of claim 10, wherein the cache tree is employed to share a state of the job steps across a plurality of requested jobs.

13. The computer-readable memory of claim 10, wherein cacheable job steps to be executed following non-cacheable job steps are treated as non-cacheable job steps.

* * * * *